United States Patent
Scaburri et al.

(10) Patent No.: US 6,635,855 B1
(45) Date of Patent: Oct. 21, 2003

(54) SYSTEM FOR HEATING OF BODIES IN GENERAL BY INDUCTION, ESPECIALLY FOR COOKING FOOD

(76) Inventors: Marino Scaburri, Via L. da Vinci 17, 21017 Samarate (IT); Carlo Scaburri, Via Borsa 87, 20052 Monza (IT); Bruno Bertuzzi, Via Mameli 5, 29029 Rivergaro (IT)

( * ) Notice: Subject to any disclaimer, the term of this patent is extended or adjusted under 35 U.S.C. 154(b) by 0 days.

(21) Appl. No.: 09/869,240
(22) PCT Filed: Feb. 5, 1999
(86) PCT No.: PCT/IT99/00023
§ 371 (c)(1), (2), (4) Date: Jun. 26, 2001
(87) PCT Pub. No.: WO00/44201
PCT Pub. Date: Jul. 27, 2000

(30) Foreign Application Priority Data

Jan. 22, 1999 (IT) .......................... MI99A0108

(51) Int. Cl.⁷ ................................. H05B 6/12
(52) U.S. Cl. ........................ 219/621; 219/624
(58) Field of Search ................. 219/621, 624, 219/620, 622, 625, 647, 649, 618; 126/390.1, 400, 246

(56) References Cited

U.S. PATENT DOCUMENTS

| | | | |
|---|---|---|---|
| 3,745,290 A | * | 7/1973 | Harnden, Jr. et al. ....... 219/621 |
| 4,432,340 A | * | 2/1984 | Conant et al. ........... 126/390.1 |
| 4,614,852 A | * | 9/1986 | Matsushita et al. ......... 219/621 |
| 4,646,935 A | | 3/1987 | Ulam |
| 5,487,329 A | | 1/1996 | Fissler |
| 5,506,062 A | * | 4/1996 | Flammang .................. 428/614 |
| 5,564,590 A | * | 10/1996 | Kim .......................... 220/626 |
| 5,711,290 A | * | 1/1998 | Kim .......................... 126/390.1 |
| 5,954,984 A | * | 9/1999 | Ablah et al. ................ 219/621 |

FOREIGN PATENT DOCUMENTS

FR  2 739 998 A  4/1997

OTHER PUBLICATIONS

Hawley's Condensed Chemical Dictionary.–13th ed/revised by Richard J. Lewis, Dr.*

* cited by examiner

Primary Examiner—Quang T. Van
(74) Attorney, Agent, or Firm—Michael J. Striker

(57) ABSTRACT

A system is provided for heating by induction in a receptacle (17) of non-ferrous materials such as aluminum, PFTE, earthenware and others, of an insert (18) consisting of a thin body of ferromagnetic material, such as wire gauze, which is deeply embedded in the base (21) of the receptacle (17). The base is subsequently ground and polished to render the external surface of the thin body (18) of ferromagnetic material perfectly coplanar with the material surrounding it.

12 Claims, 3 Drawing Sheets

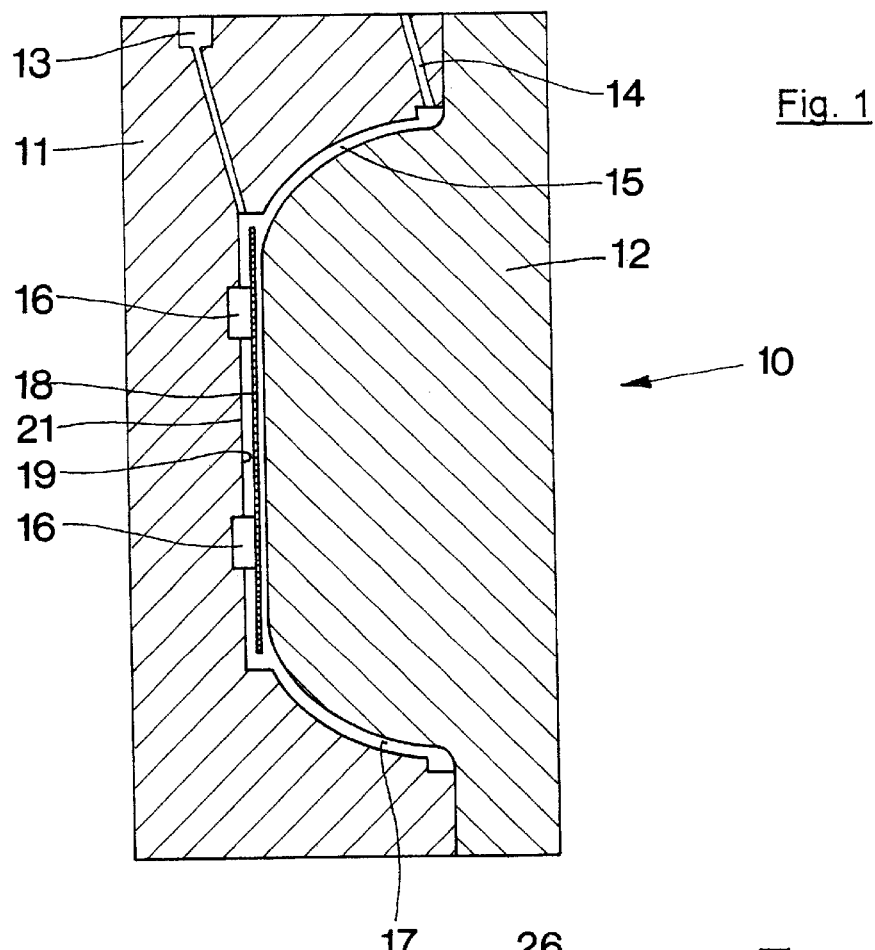
Fig. 1
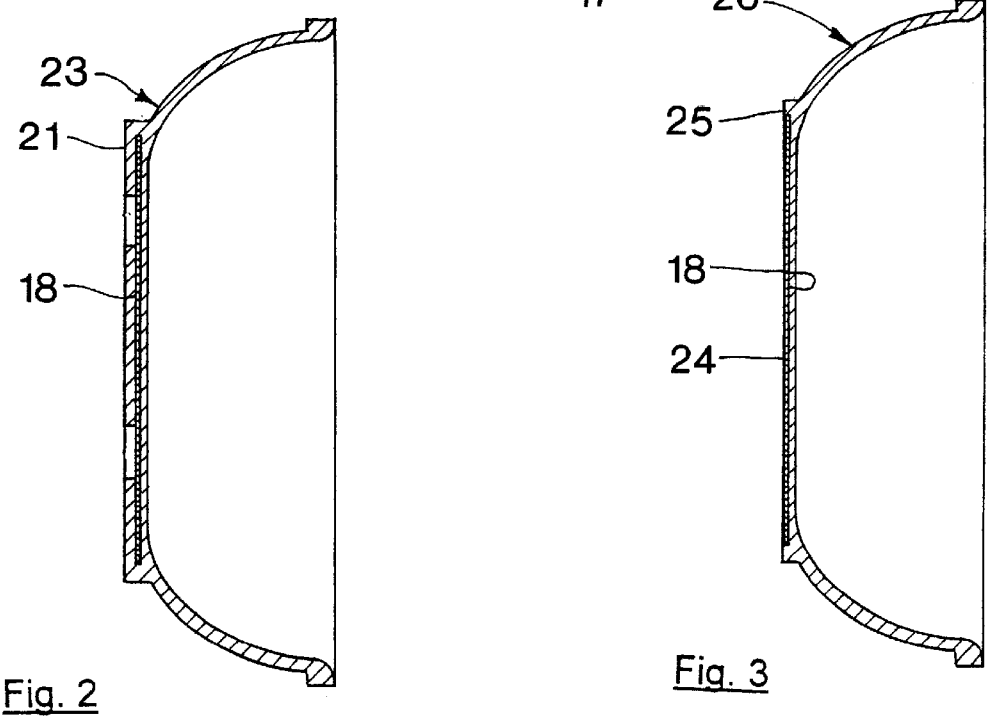
Fig. 2
Fig. 3

SYSTEM FOR HEATING OF BODIES IN GENERAL BY INDUCTION, ESPECIALLY FOR COOKING FOOD

BACKGROUND OF THE INVENTION

The invention concerns heating of bodies in general by induction especially for purposes of cooking food.

It is well known that considerable development has taken place in high-frequency induction heating.

In an internally situated conductor, an AC-wound solenoid generates eddy currents the entity of which increases as AC frequency rises.

In the presence of a high frequency, therefore, eddy currents greatly increase and can be used for ovens, hotplates and the like.

Another well-known and effective way of using heating created by induced current is that of associating a wire gauze of ferromagnetic material to the base of receptacles suitable for containing objects, such as food and other things, to be cooked, which material, by its very nature, heats up under the effect of an induction field, transmitting the heat to the receptacle and therefore to the food or anything else in said receptacle. This system of heating presents a problem in that the wire gauze is insufficiently integrated in the base of the receptacle and can easily become detached from it partly due to uneven dilation between the base of the receptacle and the wire-gauze—the two being of different materials—but also to warping of said base if the receptacle is made by die-casting. Both drawbacks considerably lessen the efficiency of the system.

SUMMARY OF THE INVENTION

The invention here described eliminates or greatly reduces said problems as will now be explained.

Subject of the invention is a system for induction heating and for cooking bodies in general, especially food, in a receptacle so heated, by application of an insert, consisting of a thin piece of ferromagnetic material, to the base of the receptacle.

The insert is integrated in said base becoming deeply embedded in it. The base is then ground and polished so that the outer surface including the ferromagnetic material is perfectly smooth.

The insert advantageously consists of a ferromagnetic wire gauze.

The wire gauze may be of the type known as stretched.

Alternatively the insert may consist of a closely perforated ferromagnetic sheet, the holes being round, square or of some other shape.

In one type of execution the insert may be embedded by placing it inside a die for casting a receptacle of non-ferrous material such as aluminium, nickel, cobalt, copper and alloys thereof.

The insert is placed in the die so that, after casting, it is fully covered by the base of the receptacle. This complete coverage at the base of the receptacle may be achieved by placing spacers in the bottom of the die in order to create a certain thickness between the insert and the external surface of said base.

The spacers are chosen for their magnetic properties if the die is to be placed vertically.

In one type of execution the insert is cast into an aluminium base which is then applied to a steel cooking pan.

In one type of execution the insert is incorporated into the base of a receptacle made of PTFE using suitable means for placing it on the bottom of the die into which the PTFE is poured to cast the receptacle.

In one type of execution the insert is incorporated into the base of a receptacle made of Tetrafluoroethylene Polymer (PTFE) using suitable means for placing it on the bottom of the die into which the PTFE is poured to cast the receptacle.

In another type of execution the insert is incorporated in the base of an earthenware or glass receptacle.

The invention offers evident advantages.

Far greater heating efficiency is ensured by integration of the ferrormagnetic insert, whether this consists of a wire gauze or of an equivalently perforated sheet, into the base of the receptacle for heating or for cooking food, such integration being obtained by complete incorporation of the insert into the material of the receptacle.

The present probable detachment, over time, of the wire gauze from the base of an ordinary receptacle is avoided.

Grinding and polishing of the base at conclusion of the operation ensures a close surface match between an induction-heated hotplate and the base of the receptacle, therefore maximum interaction with the magnetic field and a much higher level of efficiency.

Characteristics and purposes of the invention will be made clearer by the following examples of its execution illustrated by diagrammatically drawn figures.

BRIEF DESCRIPTION OF THE DRAWINGS

FIG. 1 Die for casting an aluminium frying pan with a ferromagnetic wire gauze insert, during the casting process, longitudinal section.

FIG. 2 The frying pan extracted from the die, longitudinal section.

FIG. 3 The frying pan taken from the die, and after grinding and polishing, longitudinal section.

DETAILED DESCRIPTION OF THE PREFERRED EMBODIMENTS

Figure 4:
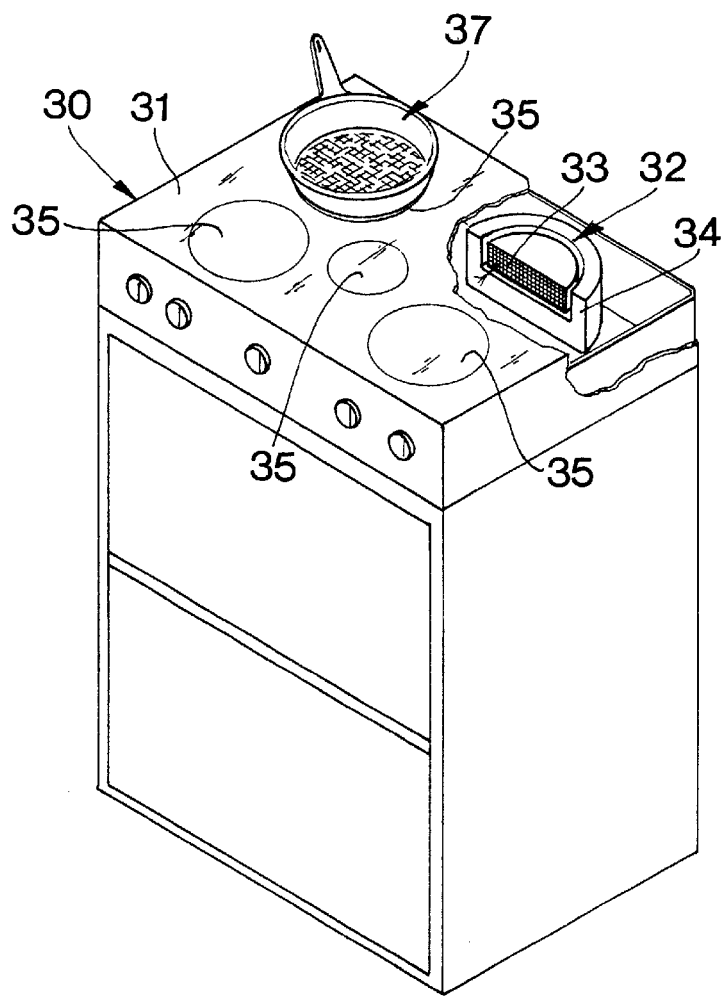
FIG. 4 Top of cooker for heating by induction, perspective from above.

FIG. 1 shows a die 10 for aluminium castings comprising a female half 11 and a male half 12.

Fluid aluminium is poured in through the hole 13 while surplus air flows out through the duct 14.

The casting chamber 15 is formed between the two halves of the die, thus forming a body 17 with base 21 into which the ferromagnetic wire gauze 18 is embedded.

Said gauze 18 is kept away from the wall 19 of that half of the die by magnetic spacers 16.

Said spacers support the ferromagnetic gauze 18.

A ferromagnetic substance is known to be one whose behaviour is similar to that of iron in suitable magnetic phenomena; it therefore becomes magnetised in a particularly intense fashion and maintains its magnetisum, as do nickel, cobalt, gadolinium and their alloys.

On opening the die 10 the semi-finished aluminium body 23 can be extracted with the ferromagnetic wire gauze 18 embedded in its base 21. At this stage (FIG. 3), the base 21 is ground and polished showing up the surface 24 of the wire gauze 18, said surface being perfectly coplanar with that of the base 25 of the receptacle 26.

FIG. 4 presents an induction headed cooker with a top surface 31 whose hotplates 35, formed of electric induction devices 32 comprising the laminar layers 33 and the magnet 34.

Figure 5:
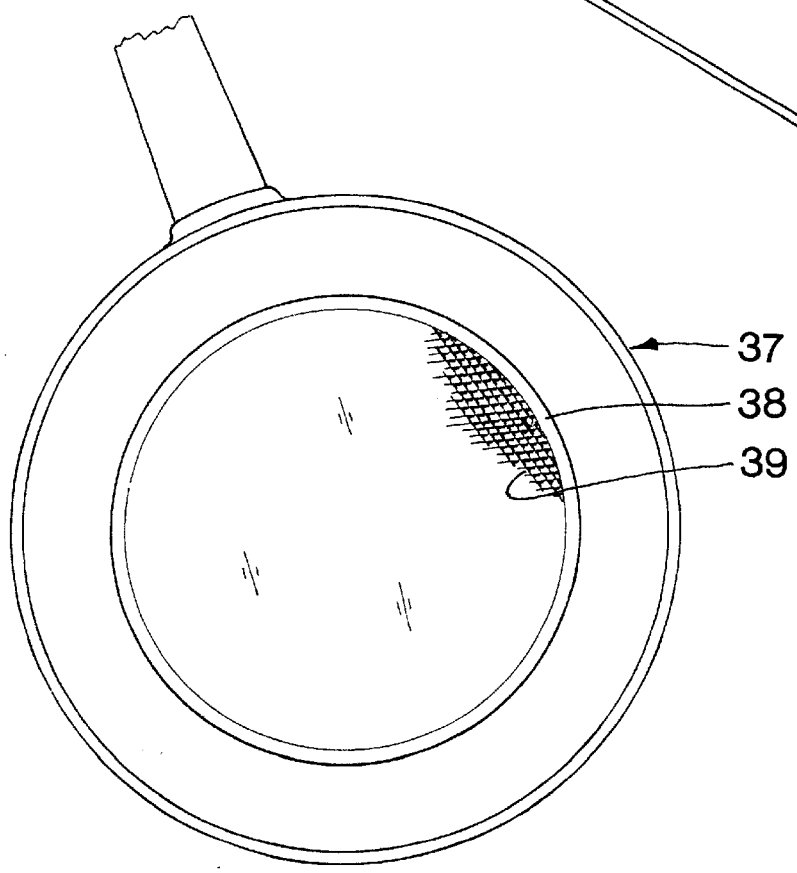
FIG. 5 Frying pan with incorporated stretched wire gauze insert, rear view.

The frying pan 37, illustrated in FIG. 5, is placed on one hotplate 35. The base 38 of said frying pan includes the stretched wire gauze 39 whose outer surface is perfectly coplanar with that of said base 38. Induction heating that passes through said wire gauze 39 will clearly be transmitted in full efficiency to the food in the pan.

Figure 6:
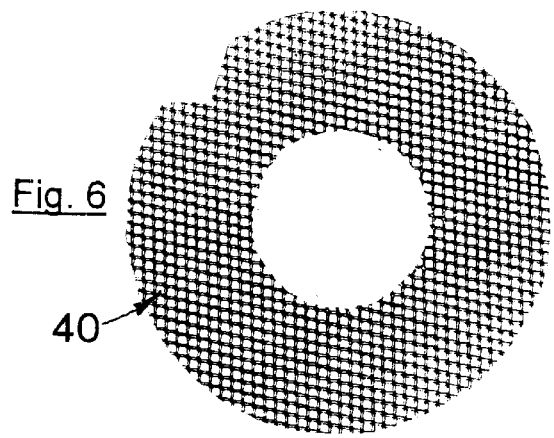
FIG. 6 Ferromagnetic pressed wire gauze insert, front view.

In FIG. 6 a ferromagnetic insert is formed of a stretched wire gauze 40.

Figure 7:
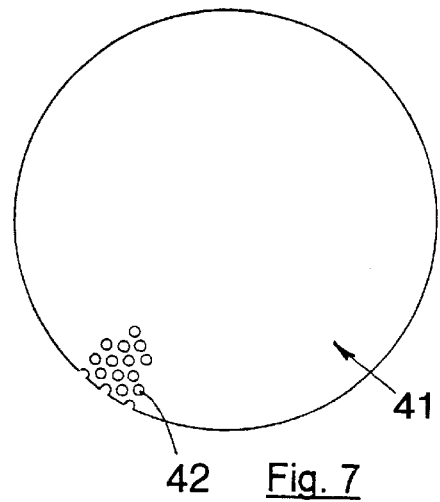
FIG. 7 Ferromagnetic insert consisting of a perforated sheet with round holes, front view.
Figure 8:
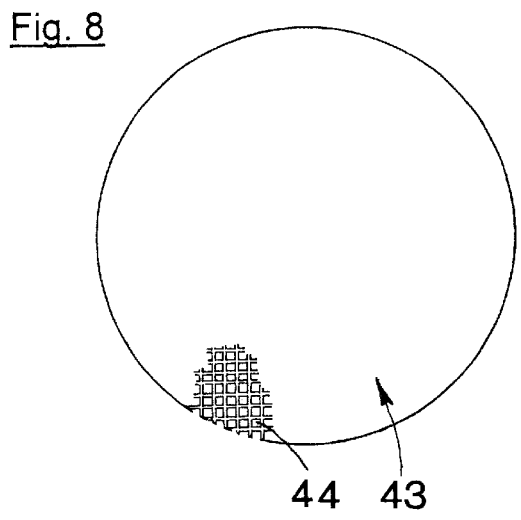
FIG. 8 Ferromagnetic insert consisting of a perforated sheet with square holes, front view.

FIGS. 7 and 8 illustrate thin ferromagnetic disks 41, 43 made with perforated holes that are circular in 42 and square in 44.

Figure 9:
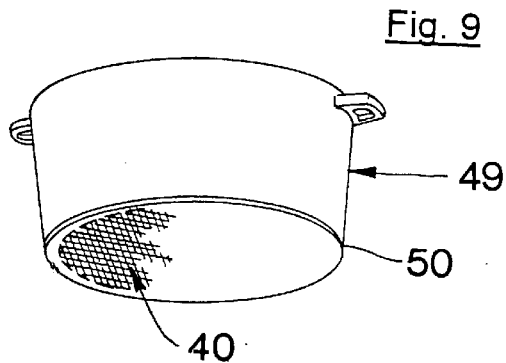
FIG. 9 Steel cooking pan with an aluminium base plate in which a ferromagnetic wire gauze insert is embedded, rear perspective view.

In FIG. 9 is a steel pan 49 to which is associated an aluminium base 50 into which the ferromagnetic stretched wire gauze 40 is incorporated.

Figure 10:
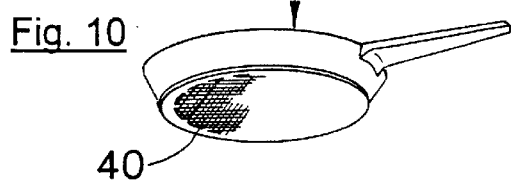
FIG. 10 PTFE frying pan with a ferromagnetic wire gauze insert embedded in the base, rear perspective view.

FIG. 10 illustrates a moulded PTFE baking tin with a ferromagnetic gauze 40 embedded in its base.

Figure 11:
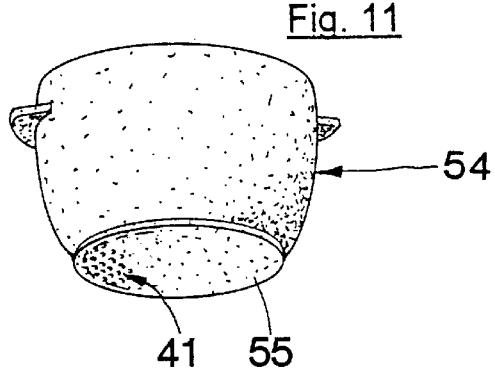
FIG. 11 Earthenware pan with a ferromagnetic wire gauze insert in the base, rear perspective view.

FIG. 11 on the other hand illustrates an earthenware pan 54 whose base 55 incorporates a perforated disk 41 as already seen in FIG. 7.

Figure 12:
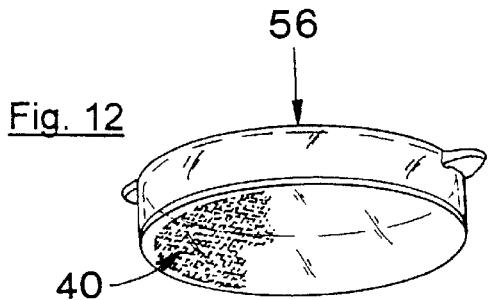
FIG. 12 Glass baking pan having a very low cubic dilation coefficient and with a ferromagnetic wire gauze insert embedded in the base, rear perspective view.

FIG. 12 illustrates a glass dish 56 of very low cubic dilation coefficient in whose base is embedded a ferromagnetic gauze net 40 as in FIG. 6. It will be clear from all these examples that the ferromagnetic gauze net, or any equivalent means such as ferromagnetic sheets, disks and the like with perforated parts to ensure synergy with the material of which the receptacle is composed, make possible high efficiency induction heating as a result of the field generated by induction heated hotplates.

What is claimed is:

1. System for induction heating and cooking of bodies in general, especially food, in a receptacle by application, in a die, to a base of the receptacle of an insert consisting of a thin body of ferromagnetic material, characterized in that the insert is completely enclosed by placing in a base of the die magnetic spacers that create, between the insert and an external surface of the base of the receptacle, a certain thickness even if the die is placed vertically.

2. System as in claim 1, wherein the die is suitable for a casting process in non-ferrous metal, wherein said non-ferrous metal is selected from the group consisting of aluminum, nickel, cobalt, copper and their alloys.

3. System as in claim 1, wherein the receptacle is made of tetrafluoroethylene polymer (PTFE).

4. System as in claim 1, wherein the insert is a piece of gauze.

5. System as in claim 4, wherein the gauze is of the type known as stretched.

6. System as in claim 1, wherein the insert is a perforated sheet having perforations spaced closely to one another.

7. System as in claim 6, wherein the perforations are round.

8. System as in claim 6, wherein the perforations are square.

9. System as in claim 1, wherein the base of the receptacle is ground and polished to render an external surface of the insert perfectly coplanar with material surrounding it.

10. System as in claim 1, wherein the receptacle is made of earthenware.

11. System as in claim 1, wherein the receptacle is made of glass.

12. System as in claim 1, wherein the insert is incorporated by casting in an aluminum base applied to a steel cooking pan.

* * * * *